United States Patent
Christini et al.

(10) Patent No.: US 6,182,991 B1
(45) Date of Patent: *Feb. 6, 2001

(54) TWO WHEEL DRIVE BICYCLE WITH A SHOCK-ABSORBING FRONT FORK

(75) Inventors: Steven J. Christini; Michael J. Dunn, both of Philadelphia, PA (US); Jeremy T. Shook, Ballston Spa, NY (US); Robert L. Pigeon, Lafayette Hill, PA (US); Louis J. Allora, Morristown, NJ (US)

(73) Assignee: Christini Technologies, Inc., Philadelphia, PA (US)

(*) Notice: Under 35 U.S.C. 154(b), the term of this patent shall be extended for 0 days.

This patent is subject to a terminal disclaimer.

(21) Appl. No.: 09/372,160

(22) Filed: Aug. 11, 1999

Related U.S. Application Data

(63) Continuation-in-part of application No. 09/171,742, filed on Oct. 23, 1998.
(60) Provisional application No. 60/016,232, filed on Apr. 26, 1996, and provisional application No. 60/096,264, filed on Aug. 12, 1998.

(51) Int. Cl.⁷ .................................................. B62M 1/00
(52) U.S. Cl. ................................ 280/230; 74/665 F
(58) Field of Search .................... 280/230, 210, 280/283; 180/223, 224, 240; 74/66.56 E, 665 R, 665 F

(56) References Cited

U.S. PATENT DOCUMENTS

| | | | |
|---|---|---|---|
| 4,029,332 | 6/1977 | Davis | 280/234 |
| 4,397,369 | 8/1983 | Read | 180/205 |
| 4,479,660 | 10/1984 | Patterson | 280/261 |
| 4,611,684 | 9/1986 | Geschwender | 180/223 |
| 4,773,662 | 9/1988 | Phillips | 280/234 |
| 4,895,385 | 1/1990 | Becoat | 280/259 |
| 5,004,258 | 4/1991 | Becoat | 280/259 |
| 5,042,608 | 8/1991 | Horiike | 180/219 |
| 5,052,705 | 10/1991 | Ringle | 280/212 |
| 5,054,572 | 10/1991 | Parker | 180/224 |
| 5,113,964 | 5/1992 | Yamauchi | 180/224 |
| 5,116,070 | 5/1992 | Becoat | 280/259 |
| 5,158,314 | 10/1992 | Pinos | 280/259 |
| 5,184,838 | 2/1993 | Becoat | 280/259 |
| 5,224,725 | 7/1993 | Erlston | 280/259 |
| 5,253,889 | 10/1993 | Kaminski | 280/230 |
| 5,324,057 | 6/1994 | Chartrand | 280/261 |
| 5,332,244 | 7/1994 | Turner | 280/230 |
| 5,390,946 | 2/1995 | Spicer | 280/259 |
| 5,397,142 | 3/1995 | Schwarzenbacher | 280/260 |
| 5,417,446 | * 5/1995 | Pileggi | 280/276 |
| 5,542,689 | 8/1996 | Chalfant | 280/242.1 |

FOREIGN PATENT DOCUMENTS

| | | | |
|---|---|---|---|
| 0 445 841 B1 | 11/1994 | (EP) | B62M/17/00 |
| 0697329 A1 | 2/1996 | (EP) | B62M/23/00 |
| 0 564 523 B1 | 6/1996 | (EP) | B62M/17/00 |
| WO 93/09992 | 5/1993 | (FR) | B62M/11/14 |
| 1284821 | 8/1972 | (GB) | B62K/11/00 |

* cited by examiner

Primary Examiner—Kevin Hurley
Assistant Examiner—Andrew J. Fischer
(74) Attorney, Agent, or Firm—Cooley Godward LLP

(57) ABSTRACT

The present invention is a fully functioning two-wheel drive bicycle with a shock-absorbing front fork. The drive train which supplies power to the front wheel is incorporated into a modified frame and comprises a rear wheel driven by the traditional chain or shaft mechanism and the front wheel driven by a series of rigid shafts transferring power from the driven rear wheel to the front wheel. The drive train lengthens and shortens in parallel with the shock-absorbing front fork.

14 Claims, 14 Drawing Sheets

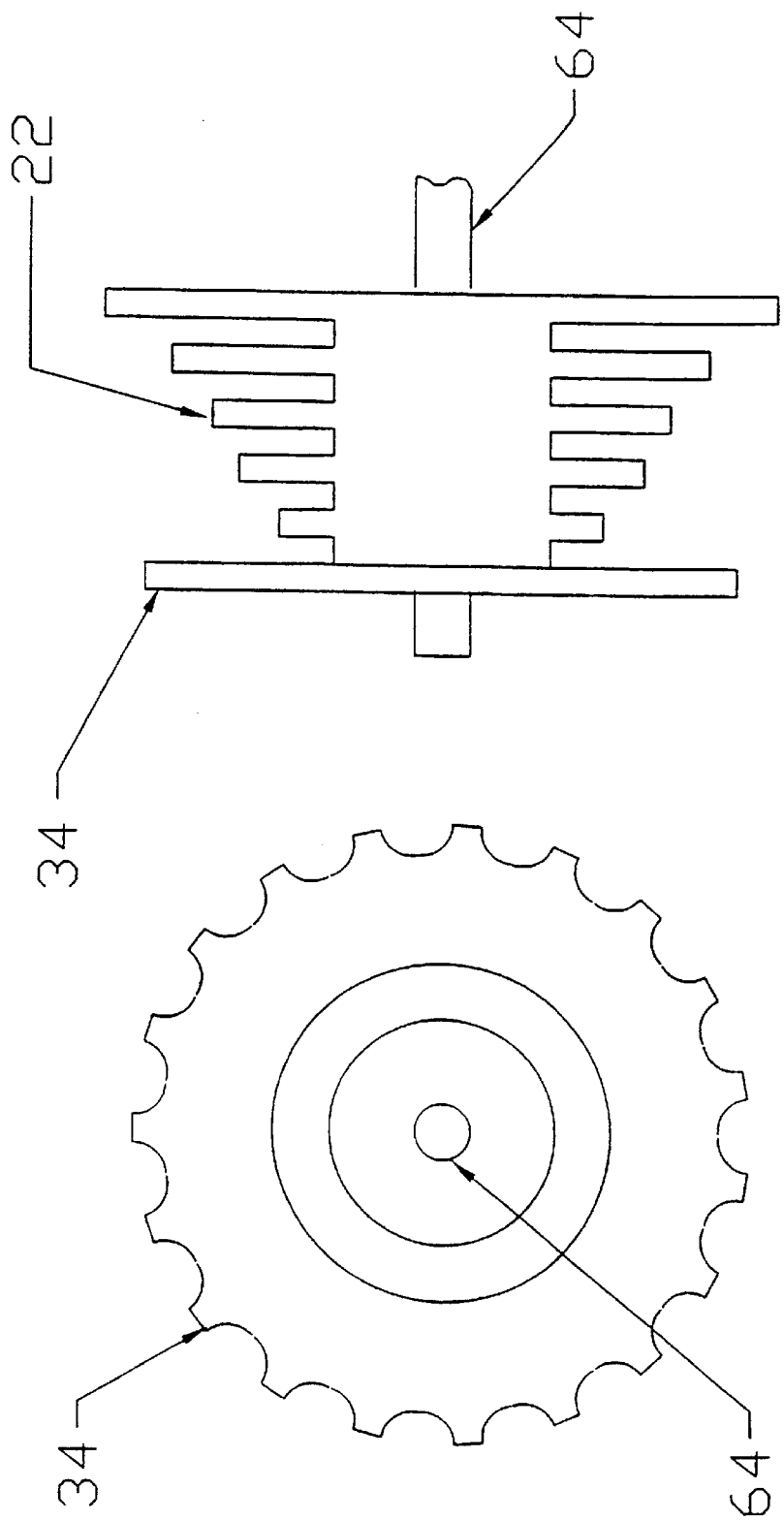

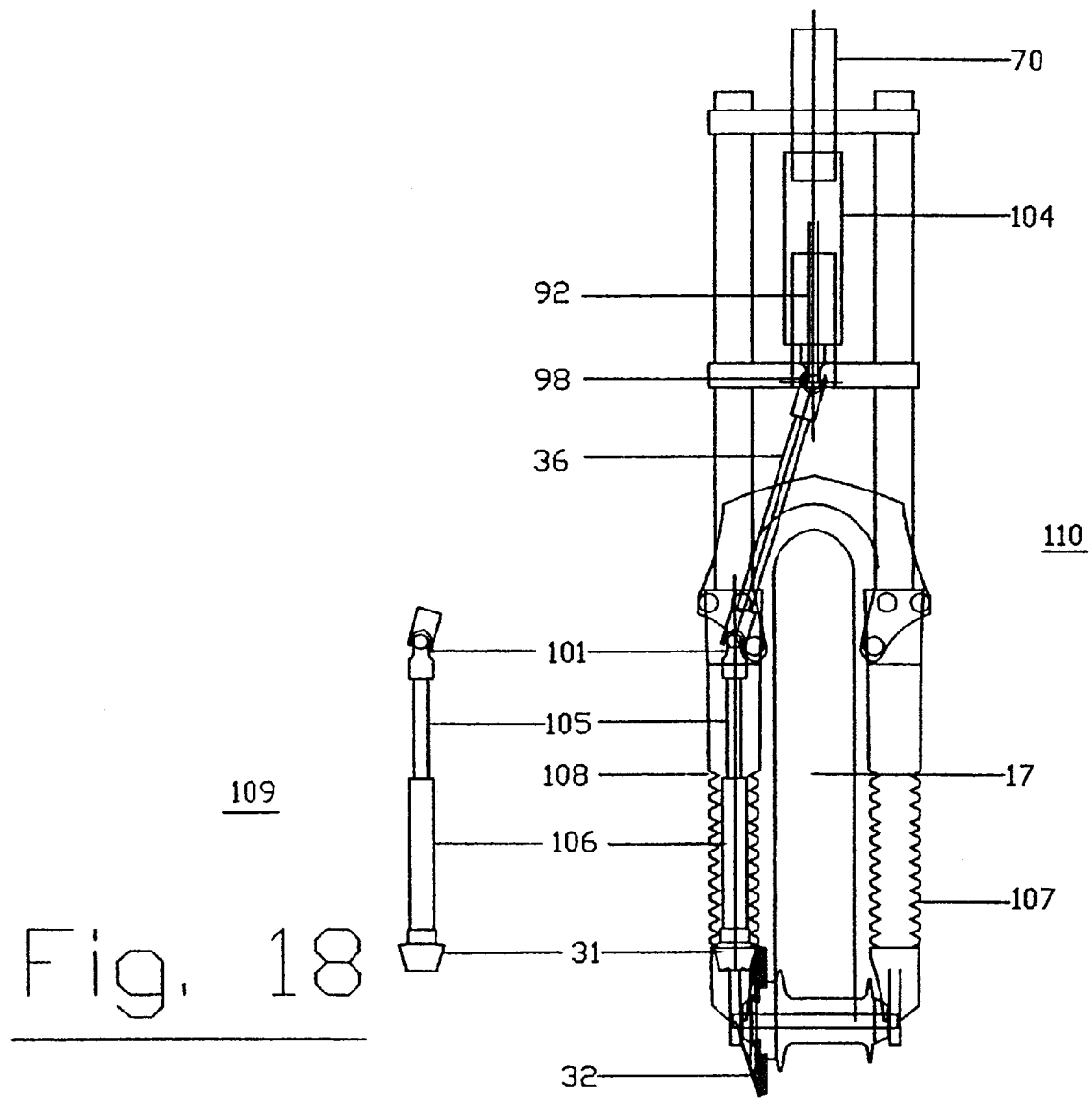

TWO WHEEL DRIVE BICYCLE WITH A SHOCK-ABSORBING FRONT FORK

This is a continuation-in-part of U.S. patent application Ser. No. 09/171,742, which was filed on Oct. 23, 1998 and relates to and claims priority to U.S. Provisional Patent Application Serial No. 60/016,232, which was filed on Apr. 26, 1996 and is entitled Two Wheel Drive Bicycle. In addition, this relates to and claims priority to U.S. Provisional Patent Application Serial No. 60/096,264, which was filed on Aug. 12, 1998 and is entitled Shock-Absorbing Front Fork For A Two Wheel Drive Bicycle. This invention relates to a two wheel drive bicycle with a shock-absorbing front fork. In particular the invention relates to a two wheel drive bicycle having the rear wheel driven by the traditional chain or shaft mechanism and the front wheel driven by a series of shafts transferring power from the driven rear wheel to the front wheel. Further, the present invention discloses a shock-absorbing front fork for the two wheel drive bicycle.

BACKGROUND OF THE INVENTION

1. Field of the Invention

2. Description of the Related Art

As off road biking has gained broader appeal, the demands that riders place on their bicycles have increased dramatically. Downhill, snow, and endurance races demand the increased traction and mobility of a two wheel drive bicycle system. Conventional bicycles are powered through a chain linking the pedal crankshaft to the rear wheel. Bicyclists are now facing many obstacles where having only rear wheel drive can lead to bicycle damage or personal injury. For professional riders, precious race time is lost avoiding obstacles such as logs, rocks, loose sand, mud, or ice. Traction and climbing ability are severely limited in extreme mountain conditions by only having the rear wheel provide power. In fact, biking professionals teach that only through learning to keep your weight on the rear wheel will beginners ever hope to improve their off-road skills. Accordingly, there is a need in the industry for a two wheeled drive bicycle which efficiently transfers power from the pedals to the front wheels, provides the rider with increased ability to safely negotiate rough terrain, and which does not detract from the aesthetic qualities and appearances of the bicycle structure itself.

The concept of a two wheel drive bicycle is not a new one. Several two wheel drive bicycle systems are patented at present using various combinations of chains, flexible cable shafts, and rocker arms mounted on the handlebars to transfer power either directly from the pedals to the front wheel or from the rear wheel to the front wheel. In general, two wheel drive bicycle systems fall into two categories: 1) permanent designs involving drive trains attached to the frame, and 2) retrofit kits which convert existing bicycles to two wheel drive. The main drawbacks to these systems are: 1) a modification to the standard bicycle in the form of a kit is expensive when considered as an addition to a bicycle purchase, 2) the low strength flexible shaft limits the allowable loading on the system, 3) the retro-fit kit requires considerable skill to attach and cannot be designed to optimally work with every frame design, and 4) the drive mechanisms are often large and openly exposed on the outside of the frame potentially creating additional hazards for the rider and detracting from the overall appearance of the bicycle.

U.S. Pat. No. 4,773,662 shows a bicycle with a front wheel driven by a chain connected to a handle-bar mounted hand pedaling system. The bicycle uses arm power to drive the front wheels and is adaptable to a conventional bicycle frame.

U.S. Pat. No. 5,542,689 shows a front wheel drive system for a bicycle which can be installed on a bicycle to drive the front wheel by rocking the handlebars back and forth. As with U.S. Pat. No. 4,773,662 mentioned previously, this bicycle attempts to harness the energy of the rider's arms as an additional power source for driving the bicycle. However, a drive mechanism requiring the use of the riders arms for more than steering, balance and control of the vehicle would likely create serious safety problems and interfere with the bicycle operation for both professional and recreational mountain bikers.

U.S. Pat. No. 5,052,705 describes a bicycle with power distribution from the rear wheel to the front wheel via a caliper and cable drive system. The drive system is activated by a caliper clamped on the rear wheel connected by a cable to a caliper on the front wheel. Inefficient power transfer to the front wheel due to slippage as well as torque loss in the cable would be a problem with this system.

U.S. Pat. No. 5,224,725 describes one permanent system that has been developed utilizing a series of chains and sprockets. This design involved many moving parts that would make the bicycle very awkward and difficult to maintain. The exposed chain that runs along the top tube would be hazardous to the rider and the front chain also would interfere with steering.

U.S. Pat. No. 5,324,057 describes a bicycle driven with a chain meshed with both the front and rear sprockets through a plurality of gears, pulleys and spring systems to power the front wheel.

Several two wheel drive bicycles demonstrate a front wheel driven by flexible cables or flexible cables in combination with chains. (See e.g., U.S. Pat. Nos. 5,332,244, 5,253,889, 5,158,314, 5,116,070, and 4,895,385) The systems, such as the bicycle produced by Turner Drive Systems of Rogers, Ark., target the market for a drive system which can be retrofit to any standard frame with modifications primarily to the gearing and chain attachments necessary to drive the front wheel.

As disclosed, U.S. Pat. No. 5,332,244 uses chain-sprocket arrangements, along with a flexible shaft to transmit some of the power from a rear gearbox to the front wheel. The retrofit system utilizes the inner most sprocket for the drive system, however the rider can use the other sprockets to shift gears normally. Deformation of the flexible cable, and corresponding loss of efficient power transfer from the rear wheel to the front wheel is a drawback of each of these systems when compared to the rigid shaft drive of the present invention.

U.S. Pat. No. 5,158,314 uses a complex mechanical system to power the front wheel from the powered rear wheel. A first traction chain coupled to the rear wheel and attached to the frame is connected to a series of rigid and flexible shafts which attach to a second traction chain which is mounted above the front wheel and powers the front wheel. U.S. Pat. Nos. 4,029,332 and 4,474,660 also describe two wheel drive bicycles with complex chain or belt drive and pulley systems. It is, therefore, the object of this invention to provide a two wheel drive bicycle which is powered by a rigid shaft drive system and, therefore, does not experience the loss of power due to slippage or elasticity associated with flexible shafts and other drive systems.

It is a further object of this invention to provide a two wheel drive bicycle wherein the rigid drive shaft system powers the front and rear wheels simultaneously in a ratio which enables safe and effective operation of the bicycle and provides immediate transfer of power from the pedals to the front wheel.

It is a further object of this invention to construct the bicycle frame in a manner that substantially encloses the shaft drive system and provides effective two wheel drive biking with no interference of rider motion, with normal braking and steering radius, and with minimal rider danger with respect to moving parts and obstruction of operation.

It is a further object of this invention to incorporate the two wheel drive technology into a shock-absorbing front fork to provide the rider with a smoother ride.

Other objects and advantages will be more fully apparent from the following disclosure and appended claims.

SUMMARY OF THE INVENTION

This is a continuation-in-part of U.S. patent application Ser. No. 90/171,742, which was filed on Oct. 23, 1998 and relates to and claims priority to U.S. Provisional Patent Application Serial No. 60/016,232, which was filed on Apr. 26, 1996 and is entitled Two Wheel Drive Bicycle. In addition, this relates to and claims priority to U.S. Provisional Patent Application Serial No. 60/096,264, which was filed on Aug. 12, 1998 and is entitled Shock-Absorbing Front Fork For A Two Wheel Drive Bicycle.

The present invention is a two wheel drive bicycle, otherwise known as an all wheel drive bicycle or a bicycle powered by both the rear and the front wheels simultaneously, with a shock-absorbing front fork. A two wheel drive bicycle provides a rider increased safety and the ability to significantly increase speed during navigation through dangerous stretches of terrain.

The present invention, as described in the first, second, third, fourth and fifth embodiments, has several objectives. The first is to create a two-wheel drive bicycle using a rigid shaft drive as the main power transfer means to the front wheel. Rigid shafts have the advantage of virtually instantaneous power transfer, whereas flexible shafts usually have from 10 to 20 degrees of rotation displacement when applied with a torque which would lead to a spongy feeling when pedaling the bicycle. Essentially, the rider could turn the pedal several inches before the front wheel would begin to turn.

Secondly, the drive system of the two wheel drive bicycle is substantially incorporated into the frame. Alternatively, the drive system should be enclosed in a tube which is attached to the frame. The primary reason for enclosing the shaft is to maintain the shaft in a fixed position thereby minimizing or eliminating slippage and, as importantly, enclosing the moving parts to minimize danger to the rider. Permanently enclosing the drive system will also avoid the costly, time consuming and often bulky modifications necessitated in configuring the retrofit two wheel drive models while also maintaining the general aesthetic appearance of a standard bicycle.

Third, both the front and back wheel of the bicycle are designed to accommodate a system of sprockets or bevel gears. The rear wheel transmits torque to the front drive means through the shaft either by using a power transfer means at the rear wheel comprising a bevel gear mounted on the rear drive sprocket set which directly interacts with the pinion gear on the drive shaft, or in the alternative, as described in the first embodiment, a drive sprocket mounted concentrically with the rear drive gear system which drives a second chain to a second sprocket and bevel gear system and engages the pinion gear on the drive shaft at a suitable distance from the rear wheel. The power is transferred from the drive shaft system to the front wheel by a pinion gear engaging with a bevel gear mounted on the axle of the front wheel.

Fourth, the neck and head tubes of the bicycle frame are designed to accommodate a pair of meshing miter gears with one being attached to the front end of the main drive shaft and the other being attached to the top end of the front drive shaft system which descends to the front wheel. The head and neck tubes, which may be either standard sized or enlarged, are necessary to enable the miter gear system to mesh at an angle of approximately 90 degrees while enabling an optimum head angle for steering responsiveness. Furthermore, the head and neck tubes should be modified to enable a turning radius of the front wheel of at least 180 degrees.

Fifth, the frame of the bicycle is modified into a split configuration to enable a straight path for the drive shaft from the rear of the bike to the head and neck tubes. However, any frame configuration which substantially incorporates the rigid drive shaft system into the frame from the vicinity of the rear wheel to the head tube and down the front fork assembly of the bicycle is envisioned. The frame should be made of aluminum alloy, although other materials could serve equally well depending upon the target market and price.

Sixth, the drive shaft descending from the neck of the bicycle to the front axle should be configured to enable both free motion in the steering of the bicycle and free rotation of the front tire as well as no interference with braking. In the embodiments disclosed herein, a pair of universal joints was used to negotiate clearance by the rigid shafts around the front wheel.

Other mechanisms and gear combinations are also envisioned. One such alternate combination, as described in the third embodiment, is an expandable universal joint system with a pair of sliding shafts that adjusts with the expansion and compression of a shock-absorbing front fork while maintaining power transmission to the front wheel. Also, as disclosed in the fifth embodiment, alternate drive components can be used instead of the miter gears for transmitting power from the main drive shaft to the front drive shaft system.

Seventh, the shock-absorbing front fork of the present invention is adapted to incorporate the two-wheel drive system.

Thus, according to the broad aspects of the invention, the two wheel drive bicycle comprises:

(a) a rigid shaft drive system that transmits power from the rear wheel to the front wheel through a series of rigid drive shafts including a main drive shaft and a front drive shaft system and a series of meshing bevel, pinion and miter gears;

(b) a frame constructed of tubing, including sections which enclose the shaft drive system and which is integral with or a part of the bicycle frame;

(c) a neck tube and a head tube designed to accommodate the drive shaft system in a manner that maintains optimum head angle and permits an adequate turning radius;

(e) a front drive shaft system descending to the front wheel configured to enable both free motion in the steering of the bicycle and free rotation of the front wheel without interfering with braking;

(f) a shock-absorbing front fork that incorporates the front wheel drive system to ensure a smoother ride.

In summary, in the present invention, the power is transferred from the pedals to the rear wheel and then to the front wheel through a rigid drive shaft system including a series of meshing gears. The frame of the bicycle is designed to contain the drive shaft that transmits power to the front wheel and is significantly redesigned. In order to have a straight path from the rear sprockets to the neck, the main frame tube is split into two tubes that run directly from the neck to a position approximately seven inches above the rear wheel axle or in the alternative, directly to a bevel gear mounted on the rear wheel.

The power is transmitted from the rear wheel to the main shaft through the extension of the drive shaft directly to the rear wheel assembly wherein the pinion gear at the end of the drive shaft meshes with a bevel gear mounted circumferentially on the rear drive gears.

At the front end, the main drive shaft connects to a miter gear system which is located inside the front head tube of the bicycle. The neck and head tube is standard-sized or, alternatively, enlarged in comparison to a standard bicycle to allow for full steering capabilities of the bicycle while transferring power to the front wheel. The miter gears as shown are connected to a short shaft within the neck tube, to one or more universal joints which are then connected to a front rigid drive shaft system. The purpose of this configuration is to allow the rigid front shaft system to negotiate around the front tire and to allow free motion of the wheel for both rotation and steering. Alternative configurations which would ensure that the front drive shaft does not interfere with steering or rotation of the front wheel are anticipated. One such alternative would reduce the number of components to a single front drive shaft. Another such alternative would utilize a single piece composed of a pair of interconnected universal joints of appropriate length with the miter gear at one end and the front drive shaft at the other end. In addition, alternate drive components can be used instead of the miter gears for transmitting power from the main drive shaft to the front drive shaft system. Those skilled in the art will recognize other methods for constructing a front shaft system which does not interfere with the front wheel, and the methods disclosed are not to be construed as limiting.

The front drive shaft transmits power to the front wheel through the interface of a pinion gear attached to the lower end of the front shaft and a bevel gear mounted circumferentially on the front wheel hub. The front wheel hub should be a ratcheting hub which catches in one direction but freewheels in the other direction to enable the rider to coast without the pedals turning.

As disclosed in the present invention, a shock-absorbing front fork is incorporated into the bicycle design. The expandable universal joint system includes a middle section with an inner sliding shaft and an outer sliding shaft that increases and decreases the distance between the universal joints as the shock-absorbing front fork expands and shortens in length. Additionally, the shock-absorbing front fork is connected to a neck tube that incorporates the features as disclosed herein, including but not limited to the cutout section which provides an adequate steering angle. Those skilled in the art will recognize other methods for constructing and mounting a shock-absorbing front fork onto the bicycle frame in a manner which does not interfere with steering or rotation of the front wheel while enabling the front drive shaft system to expand and to contract with the expansion and contraction of the shock-absorbing front fork.

The applicants believe that this design, as disclosed and broadly interpreted, creates a much sturdier and effective two wheel drive bicycle which is easier to operate. The increased traction and mobility in off road situations resulting from this two wheel drive system is an advance in two wheel drive bicycle technology. The shock-absorbing front fork enhances these advantages and further improves the overall rider experience. Other aspects and features of the invention will be more fully apparent from the following disclosure and appended claims.

DESCRIPTION OF THE DRAWINGS

FIG. 5 is a view of the modified drive sprocket;

FIG. 6 is a view of the modified rear sprocket assembly for the first embodiment;

FIRST EMBODIMENT OF THE INVENTION

Figure 1:
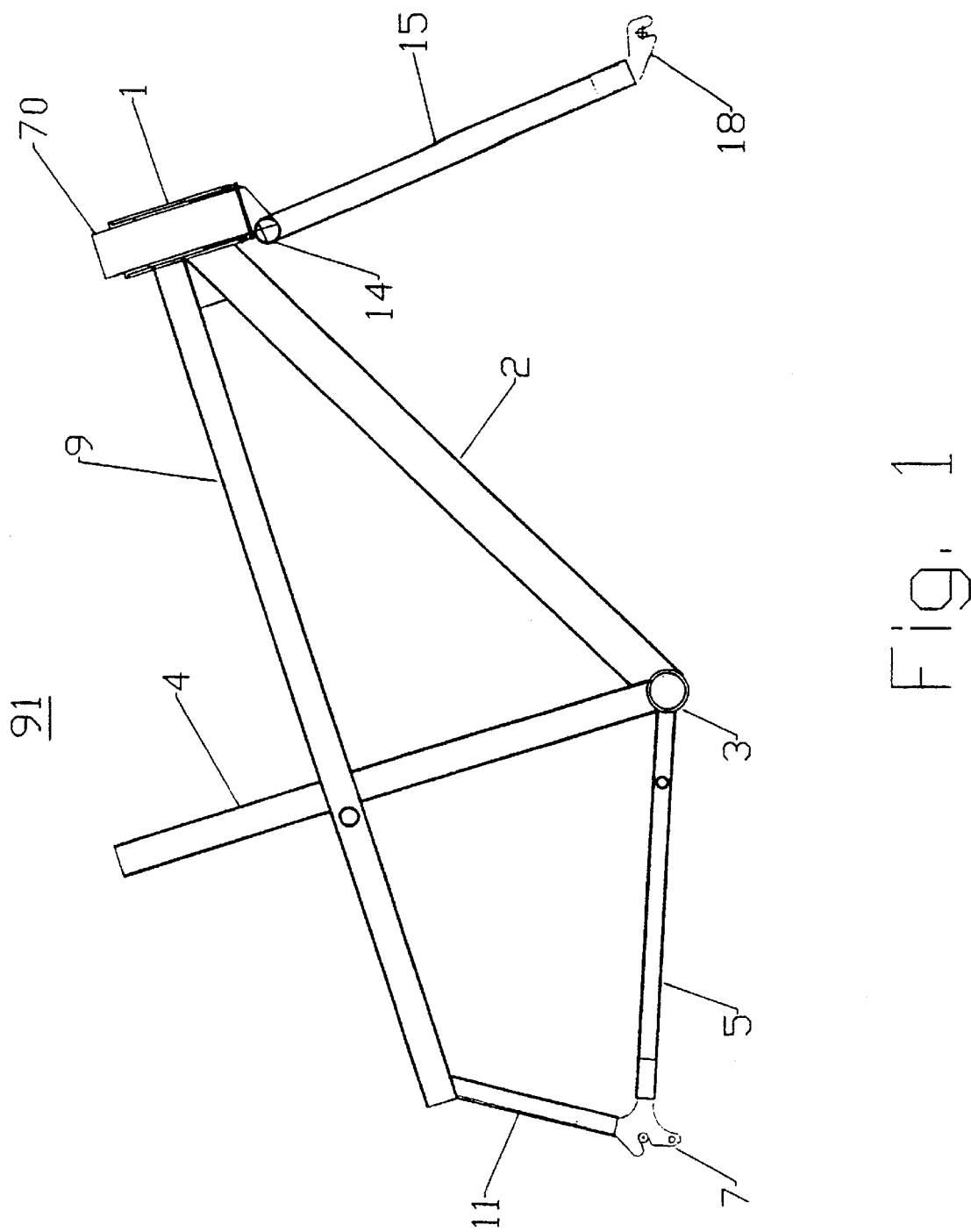
FIG. 1 is a right side view of the first embodiment of the main elements of the frame.
Figure 2:
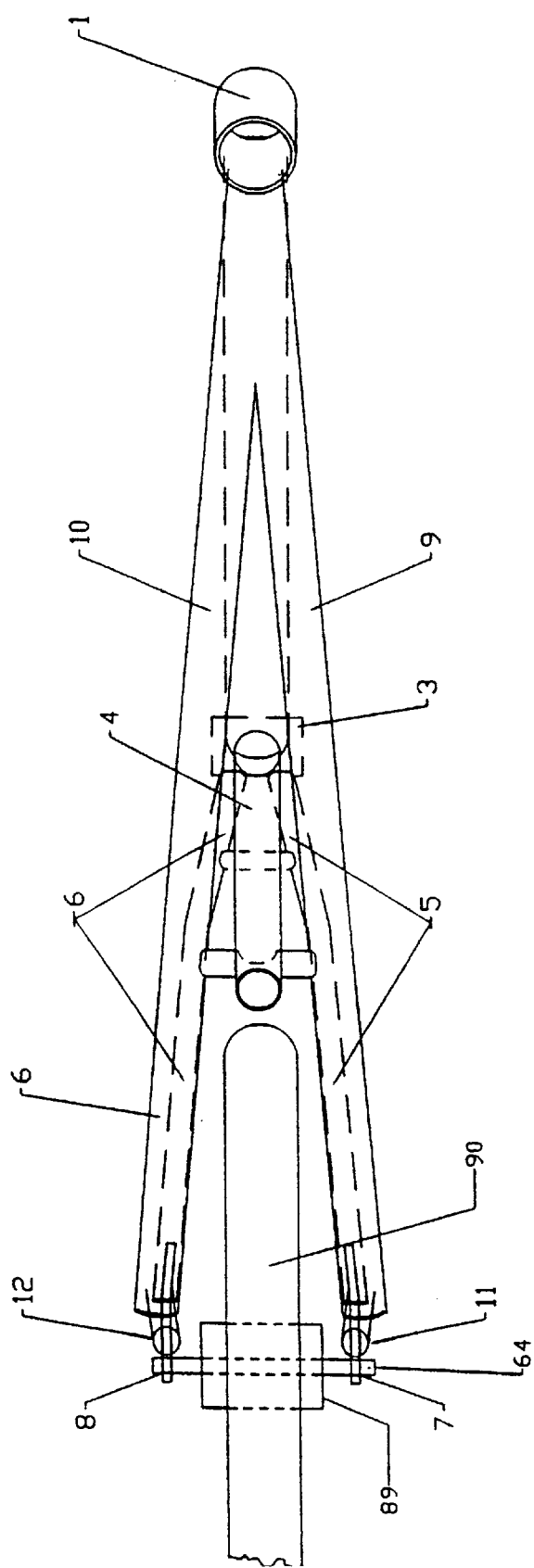
FIG. 2 is a top view of the main elements of the bicycle frame.

The present invention comprises a two wheel drive bicycle 78 having many of the same standard bicycle components such as seat 47, seat stem 48, handlebars 49, a right pedal 50, a left pedal (not shown), a pedal crank shaft 51, a front brake 52, a back brake 53, and a derailleur 54 which are not modified in this invention and which are well known in the art. Additionally, the front wheel 17 when used in this description includes the front tire 55, front wheel rim 56, front spokes 57, and front wheel hub 58, all of which are well known to one skilled in the art. Similarly, the rear wheel 90, when used in this specification includes the rear tire 61, the rear wheel rim 62, the rear spokes 63, the rear wheel hub 89, and the rear drive sprockets 22, all of which are well known to one skilled in the art.

Referring now to the drawings of the frame, FIGS. 1, 2, 3, 9, and 12 show the frame design of the first embodiment of the two wheel drive bicycle 78. The frame 91 comprises a single head tube 1, connecting a single down tube 2, which connects at the crank tube 3, with the seat tube 4, a right chain stay 5, a left chain stay 6 which then terminate with a right rear dropout 7 and a left rear dropout 8, respectively. The main drive tube 9 and the main frame tube 10 form a dual horizontal tube construction beginning at the head tube 1 at the front of the frame 91 and extending rearward where the main drive tube 9 connects to a right rear support tube 11 and the main frame tube connects to a left rear support tube 1. The right rear support tube 11 connects the rear end of the main drive tube 9 with the right chain stay 5 at the right rear drop out 7 and the left rear support tube 12 connects the rear end of the main frame tube 10 with the left chain stay 6 at the left rear drop out 8. As is well known in the art, the rear wheel 90 is mounted rotationally on the rear axle 64 between the right rear dropout 7 and the left rear dropout 8.

Figure 12:
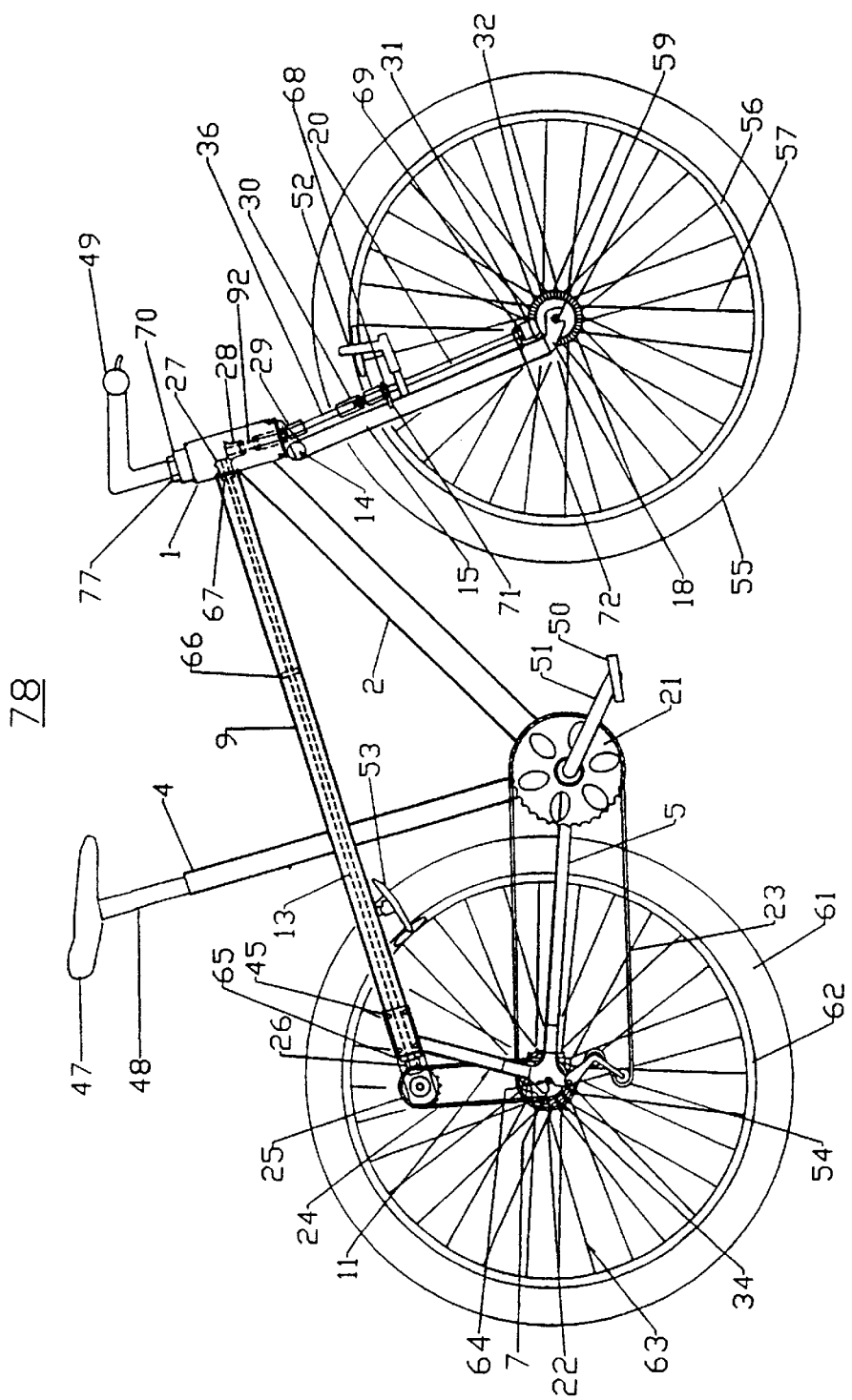
FIG. 12 is a view of the two wheel drive bicycle as described in the first embodiment.

As shown in FIG. 12, the main drive tube 9 contains the main drive shaft 13 of the two wheel drive bicycle 78. The main drive shaft 13 is supported within the main drive tube 9 by a rear drive shaft roller bearing 65, a center drive shaft roller bearing 66, and a front drive shaft roller bearing 67 to ensure smooth rotation and minimize wobble. As is well known in the art, the main drive tube 9 could be custom designed to accommodate various size main drive shaft and bearing combinations.

The frame 91 configuration of the two wheel drive bicycle 78 includes two notable changes when compared to the standard diamond shaped bicycle frame. First, the head tube 1 is significantly enlarged in order to house the first miter gear 27 and the second miter gear 28. A standard bicycle head tube is usually only 1 to 1.25 inches (25.4 to 31.75 mm) in diameter. The head tube 1 of the bicycle 78 utilizes a 2 inch (50.8 mm) diameter tube. The second modification is the use of a pair of horizontal tubes, the main drive tube 9 and the main frame tube 10 on the right and left sides of the bicycle 78 respectively, which are also mounted lower on the seat tube 4 than a single horizontal frame tube would be on a standard bicycle frame.

The main considerations for the design of the head tube 1 and the positioning of the main drive tube 9 and the main frame tube 10 is the effective transfer of power from the rear drive sprockets 22 through the main drive tube 9, through the head tube 1, and down to the front bevel gear 32 to drive the front wheel 17 in an effective manner which will not interfere with steering, pedaling or tire clearance and result in an appropriate front fork assembly angle necessary for rider safety and control. The wheel base of the bicycle 78, measured as the distance between the front axle 59 and rear axle 64, is 39 inches (0.99 m). The clearance measurement, determined as the height of an obstacle that the bicycle will be able to ride over without it striking the crank tube 3, is 9 inches (0.23 m) and is comparable to other bicycles for off road use. Finally, for optimal control, a safe head tube and front fork assembly angle for a mountain bike is between 70 and 74 degrees. As shown, the angle of the head tube 1 is 71 degrees which was accomplished by raising the main drive tube 9 and main frame tube 10 approximately 7 inches (177.8 mm), or the length of the right rear support tube 11 and the left rear support tube 12, respectively. Other longer or shorter wheel base clearance dimensions or head tube angle may be appropriate for a two wheel drive bicycle and are well known to those skilled in the art. An alternative design for achieving optimum angle of the head tube 1 is disclosed in the second embodiment of the two wheel drive bicycle 79.

Though, the frame 91 design represents a key element of the subject invention the drawings presented are not intended to be limiting. While a split frame is demonstrated, any frame design which incorporates the drive train internally from the vicinity of the rear wheel 90 to the forward head tube 1 position of the bicycle then down to the front wheel 17 is envisioned. This structure could take the form of a single tube frame provided the right shaft configuration is designed incorporating the appropriate gears and joints to facilitate the positioning of the drive shaft in the center of the bicycle as compared to being offset on the side of the frame.

Figure 3:
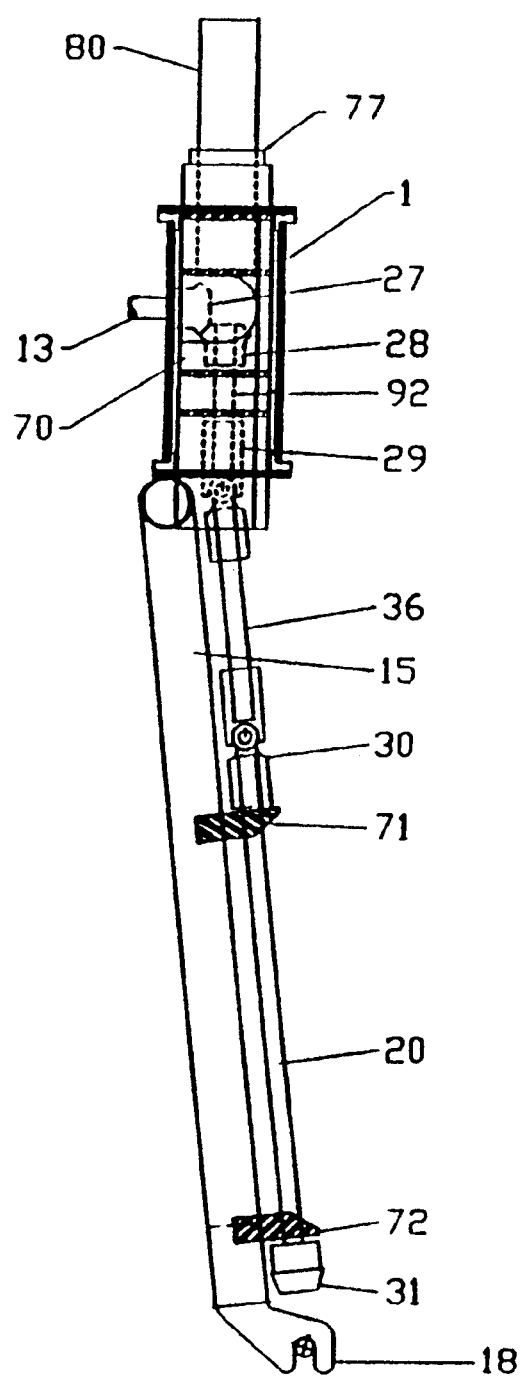
FIG. 3 is a side view of the front fork assembly with a cut away of the head tube revealing the neck tube and other head tube components.
Figure 9:
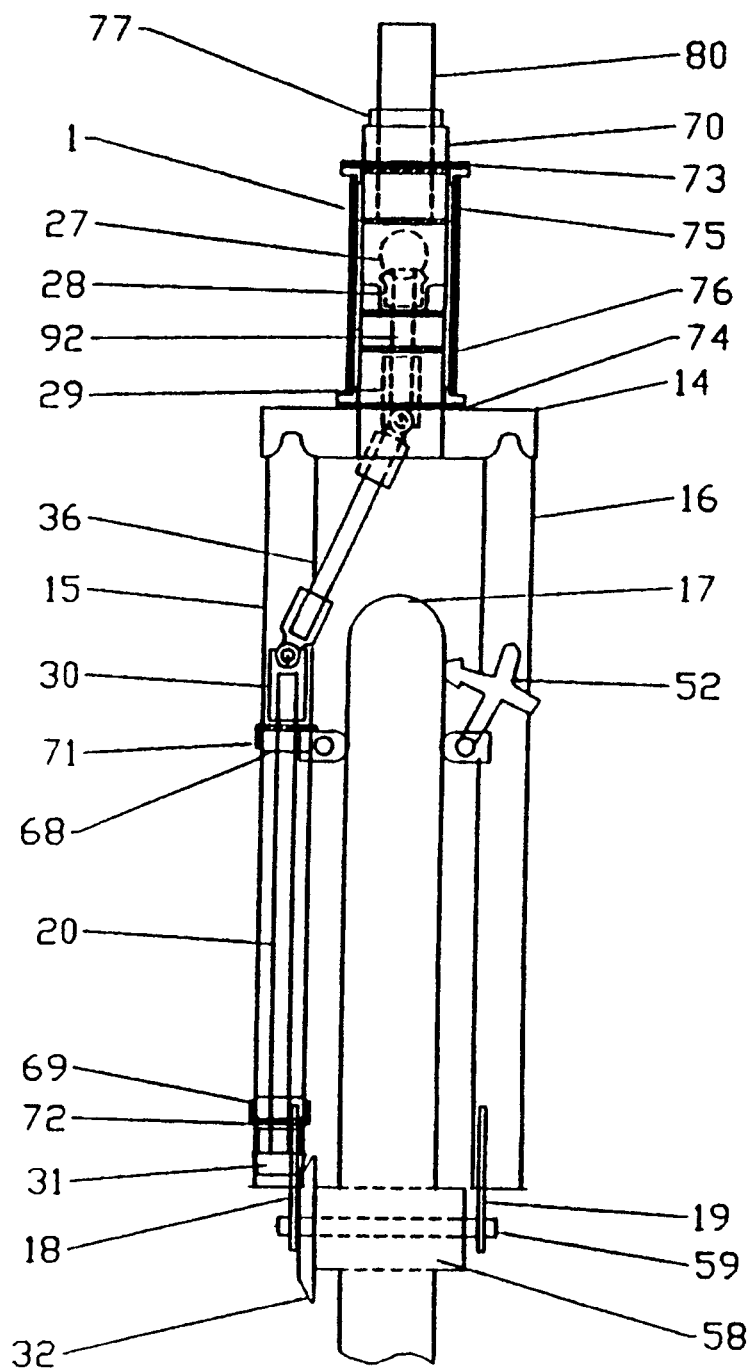
FIG. 9 is a front view of the front fork assembly.

FIGS. 3 and 9 illustrate aspects of the bicycle 78 design which encompass the front fork assembly descending from the head tube 1. The front fork assembly begins with a neck tube 70 located within the head tube 1 and connecting at one end with a front fork post support 14. The front fork post support 14 connects with the upper ends of the right front fork member 15 and the left front fork member 16 which pass along the sides of the front tire 17. The right front fork member 15 terminates at the right front dropout 18 and the left front fork member 16 terminates at the left front dropout 19. The front wheel 17 mounts rotationally on the front axle 59 between the right front dropout 17 and left front dropout 18. The right fork member 15 holds the front drive shaft 20 in the present embodiment 78. The front brakes 52 are mounted on the right front fork member 15 and the left front fork member 16 as is well known in the art.

Figure 4:
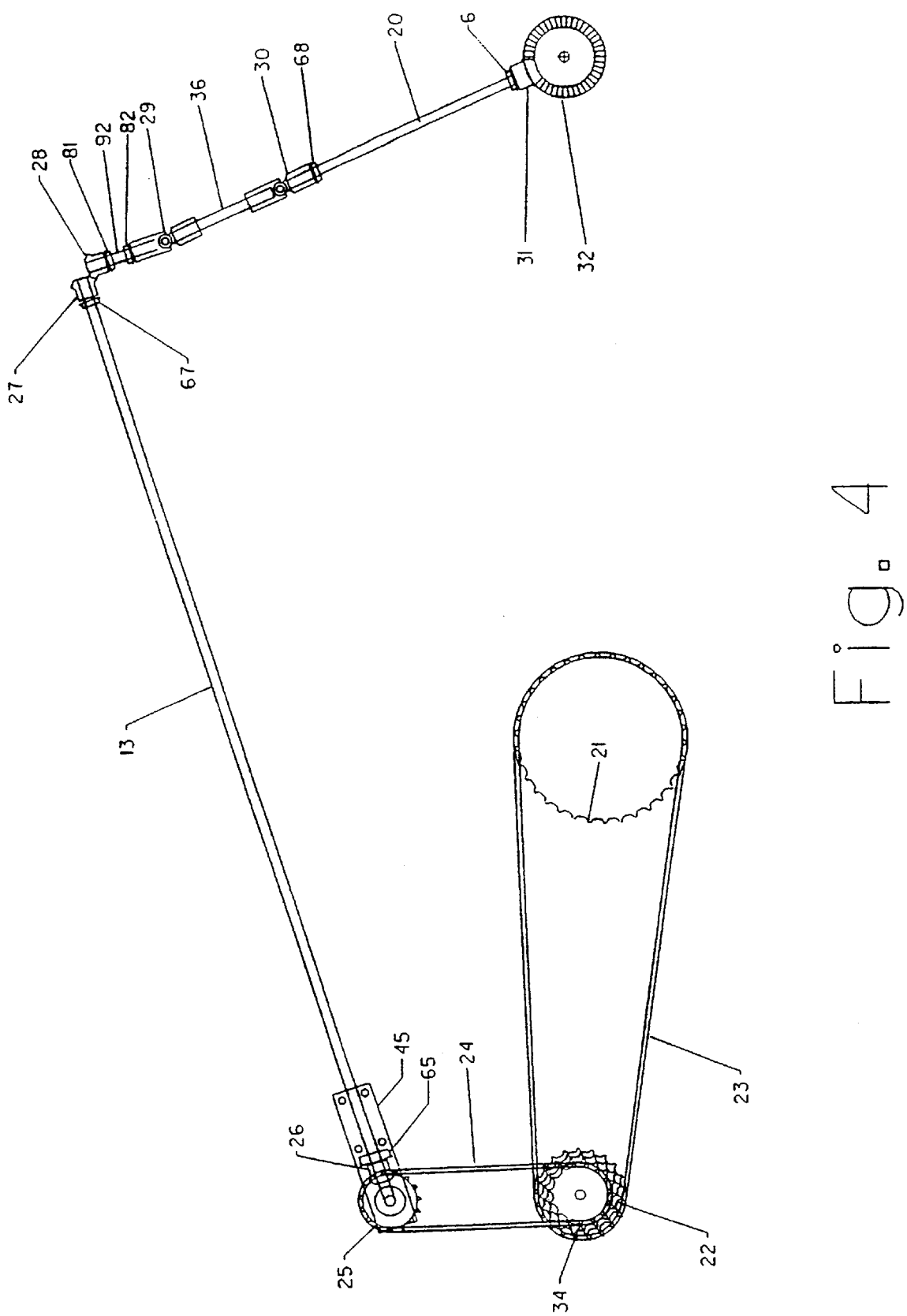
FIG. 4 is a view of the first embodiment of the bicycle drive system.
Figure 8:
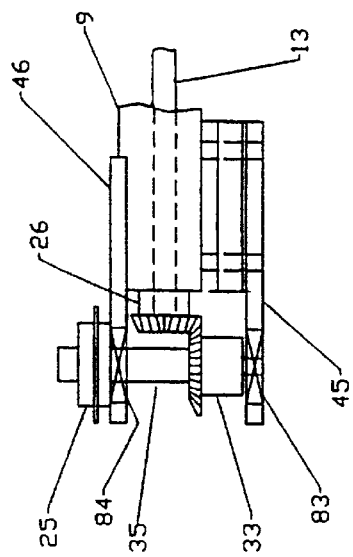
FIG. 8 is a view of the first embodiment of the rear drive assembly.

The precision design of the front fork assembly is critical for proper power transmission from the main drive shaft 13 to the front wheel 17 while allowing for a turning radius which gives the rider fill steering capabilities and allows for complete control of the bicycle. Rotationally mounted with the head tube 1 and connecting at the lower end with the front fork post support 14, is a neck tube 70. The neck tube 70 is constructed of 1.75 inch diameter tubing (though other diameter tubing could be used) and contains a cutout portion to enable pivoting around the internal drive shaft system components including a first miter gear 27 and a second miter gear during steering of the bicycle 78. As shown in FIG. 4, the neck tube 70 also contains an upper neck roller bearing 81 and a lower neck roller bearing 82 to hold the short connecting drive shaft 92 in place within the neck tube 70 for smooth rotation. Similarly, an upper fork roller bearing 68 and a lower fork roller bearing 69 mounted on the right front fork member 15 support the drive shaft 20 and permit smooth rotation.

The rear drive shaft roller bearing 65, the center drive shaft roller bearing 66, and the front drive shaft roller bearing 67 are pressure fitted to remain fixed in place. The upper neck roller bearing 81 and lower neck roller bearing 82 are held in place by washers welded within the neck tube 70. The upper fork roller bearing 68 is fixed to the right front fork member 15 by an upper fork bracket 71 and the lower fork roller bearing 69 is fixed to the right front fork member 15 by a lower fork bracket 72. As is well known in the art, alternative frame designs and embodiments could utilize other means for securing roller bearings in place and the means described are not to be construed as limiting. As is well known in the art, alternative shaft, tube and fork designs could eliminate or reduce the number of necessary roller bearings. Additionally, those skilled in the art would understand configurations of the front fork assembly which could hold the front drive shaft 20 on the left front fork member 16 and the design shown is not to be construed as limiting.

As shown in FIG. 9, the neck tube 70 is supported within the head tube 1 with means which are well known in the art as being standard on most bicycles. In order to ensure smooth turning of the neck tube 70 an upper head needle bearing 73 and a lower head needle bearing 74 at either end of the head tube 1 encircle the neck tube 70 and support axial loads of the front fork assembly. Additionally, inside the head tube 1, an upper neck needle bearing 75 and a lower neck needle bearing 76 support the neck tube 70 and keep it from pivoting, thus supporting radial loads. This assembly is tightened up by means of a large nut 77 that is threaded on the steering handle tube 80 at the top of the neck tube 70.

As shown in FIG. 3, the neck tube 70 is designed to stay enclosed within the head tube 1. Additionally, the neck tube 70 has a cutout section to allow clearance during rotation of the neck tube 70 corresponding to the steering of the handlebars 49 around the first miter gear 27 and the second miter gear 28. In the two wheel drive bicycle 78, the cutout is 1.25 inches wide and results in a steering radius of 180 degrees. Alternative designs and dimensions for cutouts in the neck tube 70 resulting in varying steering radiuses are anticipated and the dimensions disclosed should not be construed as limiting.

Figure 7:
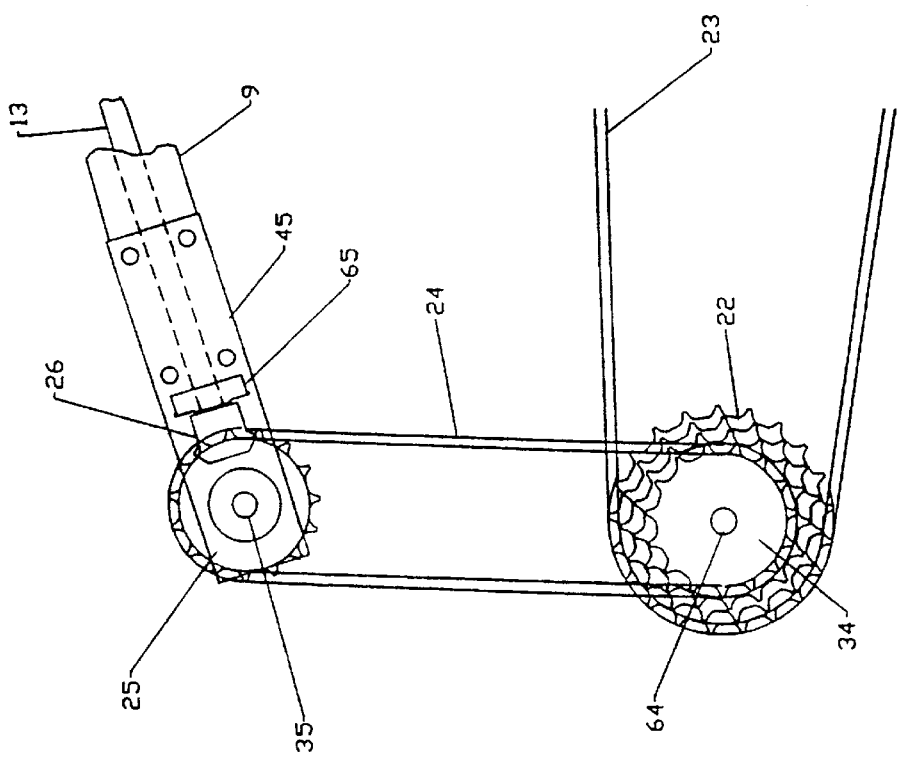
FIG. 7 is a view of the first embodiment of the rear drive assembly.

FIGS. 4 and 12 represent the first embodiment of the shaft drive system. In a conventional manner, power from the pedals is transmitted directly from the front drive sprocket 21 mounted on the pedal crank shaft 51 to the rear drive sprockets 22 via a chain 23. The rear drive sprockets 22 are mounted on the rear wheel 90 at the rear wheel hub 89 which is rotationally mounted on the rear axle 64 between the right rear dropout 7 and left rear dropout 8. As shown in FIGS. 6 and 7, a modified drive sprocket 34 is mounted concentrically on the outside of the rear sprockets 22. The modified drive sprocket 34 replaces two of a standard bicycle's 7 rear sprocket gears on the two wheel drive bicycle 78. However, the number of gears is not an essential aspect of the present invention and is not to be construed as limiting.

As shown in FIG. 7, power is transferred from the modified drive sprocket 34 through a second drive chain 24 to a second drive sprocket 25. A rear bevel gear 33 is affixed to the second drive sprocket 25 via a short axle 35 and transmits power through its interface with a rear pinion gear 26 fixed directly to the rear end of the main drive shaft 13. The second drive sprocket 25 is fixed proximal to the second rear drive system bracket 46 on the short axle 35 and the rear bevel gear 33 is fixed proximal to the first rear drive system bracket 45 on the short axle 35. The first rear drive system bracket 45 and the second rear drive system bracket 46 are constructed of 6061 reinforced plate aluminum and are fixed permanently via bolts and welding directly to the main drive tube 9. The first rear drive system bracket 45 and the second rear drive system bracket 46 are intended to hold the short axle 35 and the second drive sprocket 25 and the rear bevel gear 33 in a fixed position relative to the frame 91 while enabling them to rotate in unison for power transmission. As disclosed, the modified drive sprocket 34 is a 19 tooth sprocket and the second drive sprocket 25 is a 13 tooth sprocket, however, the number of sprocket teeth on any gear should not be construed as limiting as other sprocket teeth configurations are clearly envisioned.

On the two wheel drive bicycle 78, the meshing and rotation of the rear bevel gear 33 with the rear pinion gear 26 produces a reaction force laterally along the short axle 35, therefore, a first short axle roller bearing 83 and a second short axle roller bearing 84 were used to support this loading. This design is conservative to prevent gear displacement and is not considered limiting as those skilled in the art may clearly envision alternative and less bulky bracket and bearing designs for the rear drive system.

As shown in FIGS. 4 and 12 the rotation of the main drive shaft 13 transmits power through the first miter gear 27 fixed on the front end of said main drive shaft 13 to the second miter gear 28. The first miter gear 27 is mated to the second miter gear 28 at an approximate 90 degree angle within the head tube 1 of the bicycle 78. The power is then transferred from the second miter gear 28 through a short connecting shaft 92, a first universal joint 29, a second short shaft 36, a second universal joint 30, a front drive shaft 20 to a front pinion gear 31 mounted on the lower end of the front drive shaft 20. The front pinion gear 31 meshes with, and transfers power to, a front bevel gear 32 mounted concentrically on the front wheel hub 58. The front wheel 17 is mounted rotationally to the frame 91 on the front axle 59 between the right front dropout 18 and the left front dropout 19 and is driven by the rotational power of the front wheel hub 58.

The front wheel hub 58 is a modified freewheeling hub. Said front wheel hub 58 will catch to transmit power in one direction, but spin freely in the other direction meaning the rider can ride without the pedals turning. Such a hub is standard on rear wheels of bicycles but is necessary on the front wheel of the two wheel drive bicycle to allow the front wheel to turn while coasting.

As shown in FIG. 9, the first universal joint 29 and second universal joint 30 allow for power transmission down and around the front wheel 17 without interfering with normal steering or rotation of the front wheel 17 and, accordingly, are mounted at a 25 degree offset. Any angles which are within manufacturer's specifications are clearly anticipated for the purpose of transmitting power through the first universal joint 29 and second universal joint 30 down and around the front wheel 17.

Generally, the rear pinion gear 26, the front pinion gear 31, the first miter gear 27 and the second miter gear 28 are attached to shaft ends using setscrews and keyways (not shown) and the first universal joint 29 and second universal joint 30 are attached to shaft ends by shear pins (not shown). Use of setscrews and shear pins is appropriate because if the drive system did undergo a shock load, the failure of a shear pin or keyway would insure that there would be no severe damage incurred in any of the other drive system components, which would be more expensive to replace. Alternative connective means for attaching the pinion gears and universal joints to the corresponding shafts are well know by those skilled in the art.

For a two wheel drive bicycle, gear ratios underlying the front to back wheel rotation ratio while being powered by the pedals are important considerations. For the two wheel drive bicycle 78 the front wheel 17 to rear wheel 90 rotational ratio is 0.9876 to 1.0000, that is, the front wheel 17 turns 0.9876 times for each 1 full rotation of the rear wheel 90. While it is conceivable to design a bicycle with varying front wheel to rear wheel gearing ratios (e.g., the front wheel turns at a range of 0.90 to 1.10 revolutions for each 1 revolution of the back wheel), in testing, a ratio which would cause the front wheel to turn at a rate equal to the rear wheel, or even at a rate of greater than 1:1 (front wheel to rear wheel ratio) would create a sense of front wheel drive. As described, the ratio of 0.9876:1.0000 provides the rider with good control and handling characteristics. However, the 0.9876:1.0000 ratio is not intended to be limiting for the subject invention, but rather represents the best mode described in the first and alternative embodiments described herein. Certain riding conditions, such as up hill racing where a "front wheel drive" sensation would be desirable, may make alternative ratios more desirable (e.g., the front wheel turns 1.10 times for each 1 revolution of the rear wheel). Therefore, the gearing ratios offered are for means of illustration only and should not be construed in any way as limiting since one skilled in the art could easily develop countless alternative gear ratio combinations. Additionally, those skilled in the art will recognize that a strategy of increasing ("stepping up") the revolutions of the shaft through gear ratios, then decreasing ("stepping down") the revolutions of the front wheel will lessen the torque load and enable construction of shaft systems of minimal diameter.

The two wheel drive bicycle 78 achieves the desired 1:0.9876 rotational ratio by powering the front wheel 17 through 0.9876 revolutions for each full revolution of the rear wheel 90 by the interaction, positioning and sizes of the gears as shown in FIG. 4. The power is transferred from the modified drive sprocket 34, a 19 tooth sprocket, mounted on the rear drive sprockets 22 through the second drive chain 24 to the second drive sprocket 25, a 13 tooth sprocket, resulting in a rotational ratio of 1.46:1 ratio. The second drive sprocket 25 rotates simultaneously with the rear bevel gear 33 since both the second drive sprocket 25 and the rear bevel gear 33 are mounted on the short axle 35. In order to maintain the appropriate rotation needed to power the front wheel 17 in the same direction as the rear wheel 90, the rear bevel gear 33 is mounted proximal to the first rear drive system bracket 45. The rear bevel gear 33 mates with the rear pinion gear 26 mounted on the rear end of the main drive shaft 13. Said rear bevel gear 33 and said rear pinion gear 26 interface provides a 2:1 gear ratio yielding a total ratio to this point of the drive system of 2.92:1. That is, the main drive shaft 13 is now rotating at a rate of 2.92 for each rotation of the modified drive sprocket 34 which is turning at the same rate as the rear wheel 90. Power transferred from the main drive shaft 13 through the first miter gear 27, to the second miter gear 28, through the short connecting shaft 92, the first universal joints 29, the second short shaft 36, the second universal joint 30, the front drive shaft 20 to the front pinion gear 31 results in an unchanged rotation ratio of 2.92:1. The ratio of the front pinion gear 31 which is meshed with the front bevel gear 32 is 1:3 resulting in the final ratio of rotation between the front wheel 17 and back wheel to be 0.9876:1.

As disclosed the main drive shaft 13, the short connecting shaft 92, the second short shaft 36 and the front drive shaft 20 are manufactured of ½ inch solid steel shafts. An alternative composition for the solid shafts would be the use of ⅜ inch solid steel shafts. A further alternative would be to manufacture the shaft of ½ inch hollow steel with slightly over diameter in order to deliver the necessary torque levels while having the benefit of a reduced weight. As is well know in the art, metals and composites other than steel could be used as suitable substitutes for the shafts as long as they provided appropriate drive system strength.

SECOND EMBODIMENT OF THE INVENTION

Figure 10:
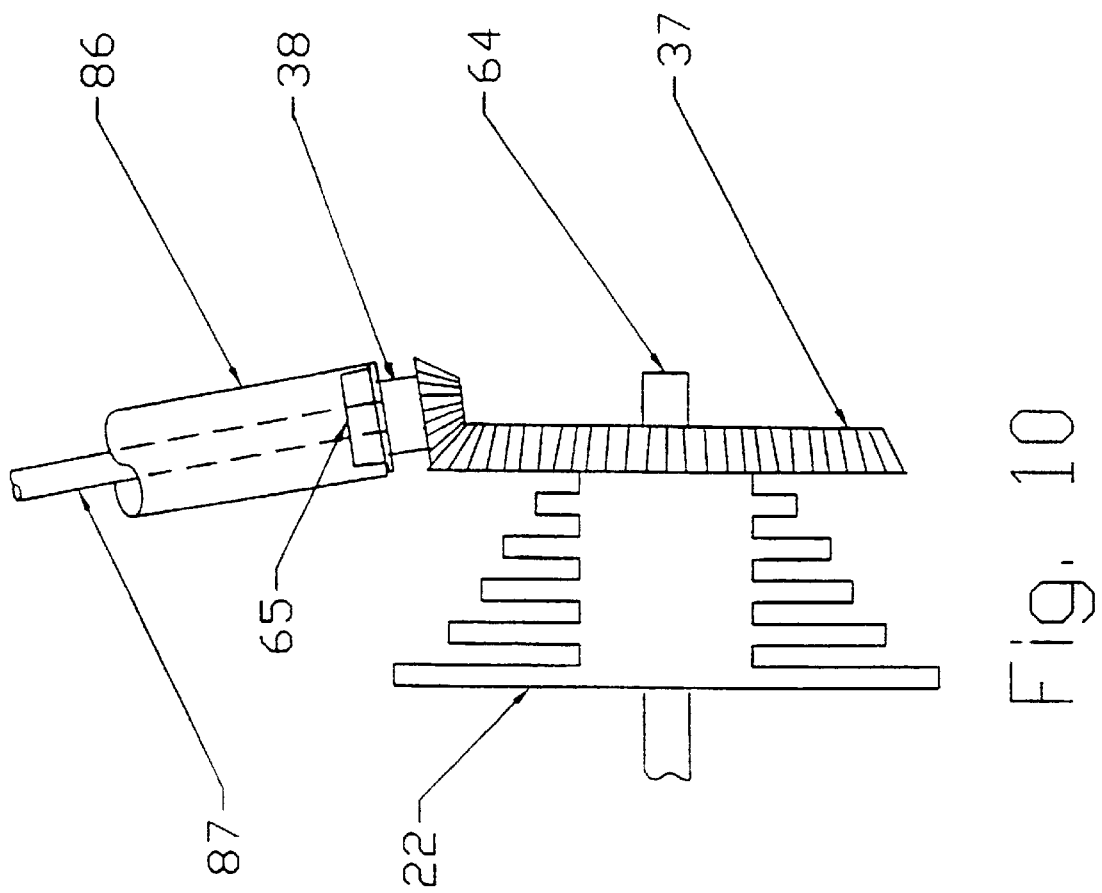
FIG. 10 is a view of the second embodiment of the modified rear sprocket assembly.
Figure 11:
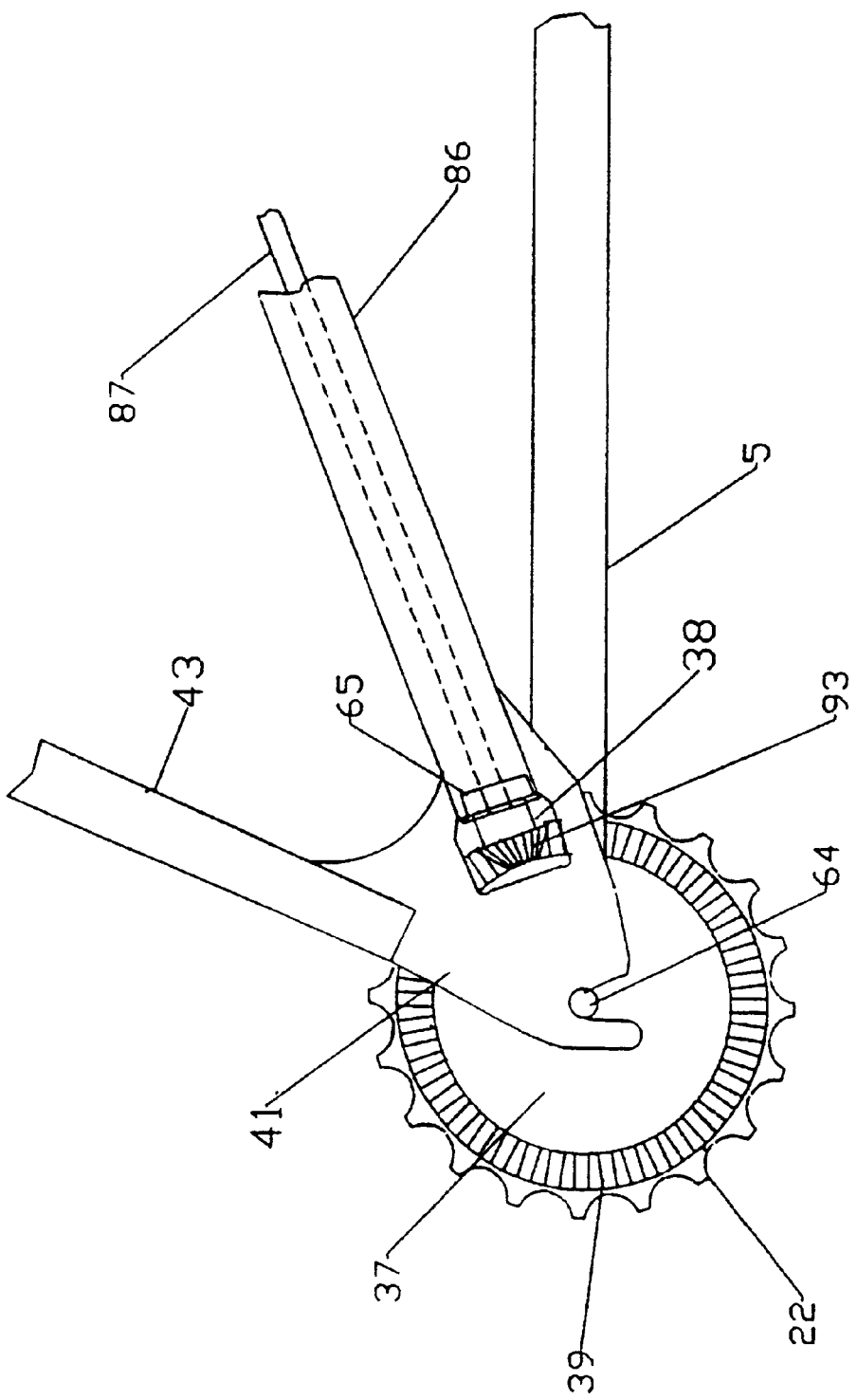
FIG. 11 is a view of the second embodiment of the rear drive assembly.
Figure 13:
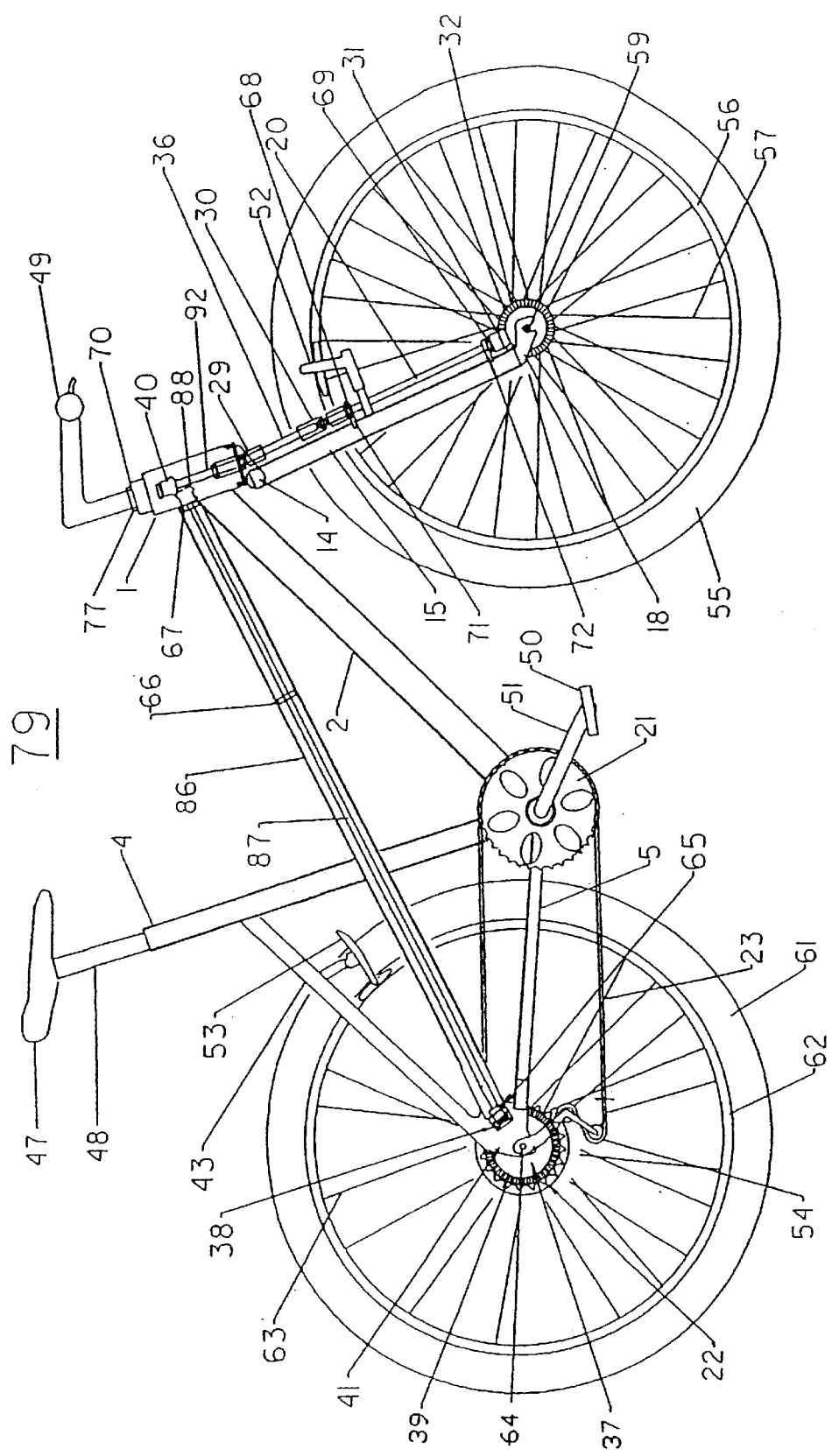
FIG. 13 is a view of the two wheel drive bicycle as described in the second embodiment.

FIGS. 10, 11 and 13 illustrate aspects of a two wheel drive bicycle 79 wherein the modified drive sprocket 34, the second drive chain 24, the second drive sprocket 25 and first rear drive system bracket 45 and the second rear drive system bracket 46 described in the first embodiment of the two wheel drive bicycle 78 are replaced by a rear wheel bevel gear 37 and a drive shaft pinion gear 38 to power the front wheel in an alternative manner.

In the second embodiment of the two wheel drive bicycle 79, the power transmitted to the rear drive sprockets 22 from the pedal crank shaft 51 through the chain 23 is transferred to the rear wheel bevel gear 37 mounted circumferentially on the outer region of the rear drive sprockets 22 to result in simultaneous turning of the rear drive sprockets 22 and the rear wheel bevel gear 37. The rear wheel bevel gear 37 meshes directly with a drive shaft pinion gear 38 to transfer power directly to the straight main drive shaft 87. As shown in FIG. 10, the bevel gear teeth 39 of the rear wheel bevel gear 37 and pinion gear teeth 93 of the drive shaft pinion gear 38 are of a helical design and cut to accept an approximate 4 degree offset. This 4 degrees is necessary to align the straight main drive shaft 87 with the angle of the straight main drive tube 86 from the modified right rear dropout to the head tube 1.

In the second embodiment 79 as shown in FIG. 13, the straight main drive shaft 87 transmits power to the front drive system via a shaft miter gear 88 which interfaces with an upper miter gear 40 which in turn delivers the power to the front wheel 17 through the short connecting shaft 92, the first universal joint 29, the second short shaft 36, the second universal joint 30, the front drive shaft 20, the front pinion gear 31, to the front bevel gear 32 in order to drive the front wheel 17 as was previously described in the first embodiment 78. Except for the reversal of the orientation of the upper miter gear 40 to the top side of the shaft miter gear 88, the front drive system remains essentially unchanged in the two embodiments disclosed. Additionally, the use and positioning of rear drive shaft roller bearing 65, the center drive shaft roller bearing 66, and the front drive shaft roller bearing 67 to support the straight main drive shaft 87, remains unchanged in the second embodiment 79.

In the present embodiment 79, the upper miter gear 40 was moved to the upper end of the short connecting shaft 92 to accommodate the reverse rotation of the straight main drive shaft 87 which was necessitated by the placement of the rear wheel bevel gear 37 on the inside of the drive shaft pinion gear 38 since the rear drive sprockets 22 would interfere if the drive shaft pinion gear 38 was placed internal to the rear wheel bevel gear 37. The straight main drive shaft 87 enters into the straight main drive tube 86 of the bicycle 79 immediately after the modified right rear drop out 41 which allows for the straight main drive shaft 87 to extend into the head tube 1 of the bicycle 79. The design of the bicycle 79 is similar to the design discussed in the first embodiment 78 except that the straight main drive tube 86 connects directly to the right chain stay 5 at the modified right rear dropout 41 on the right side of the bicycle 79, and a straight main frame tube (not shown) connects directly to the left chain stay 6 at the left rear dropout (not shown) on the left side of the bicycle 79. Additionally, a right seat support 43 connects the modified right rear dropout 41 to the seat tube 4 on the right side of the bicycle and a left seat support (not shown) connects a left rear dropout on the left side of the bicycle to the seat tube 4 and may be necessary to provide additional support for the weight of the rider. The modified right rear dropout 41 described in the second embodiment 79 has a center section cutout which is necessary to allow proper clearance and alignment of the drive shaft pinion gear 38 attached at the rear end of the straight main drive shaft 87 and extending out from the rear end of the straight main drive tube 86. This cutout also allows for ease of maintenance and cleaning of the system.

In the second embodiment of the two wheel drive bicycle 79, the rear wheel bevel gear 37 is three inches in diameter and the drive shaft pinion gear 38 is specially designed so that the meshing of the rear wheel bevel gear 37 and drive shaft pinion gear 38 transmits power through the drive system to achieve a final rear wheel 90 to front wheel 17 rotational ratio of between 1.00:0.97 and 1.00:0.99. Said design of the drive shaft pinion gear 38 is well known in the art and merely relies upon the ratio of the number of bevel gear teeth 39 to the number of pinion gear teeth 93 to create the final gearing ratio. Additionally, the rear wheel bevel gear 37 is mounted on the low gear side of the rear drive sprockets 22 at a close clearance distance to the rear end of the straight main drive tube 86 of the bicycle 79. This distance is necessary to enable proper alignment of the drive shaft pinion gear 38 on the end of the straight main drive shaft 87 as it meshes with the rear wheel bevel gear 37. The drive shaft pinion gear 38 extends out of the rear end of the straight main drive tube 86 and rests in the center of the modified right rear dropout 41.

In considering this invention, it should be remembered that the present disclosure is only illustrative, and the scope of the invention should be determined by the specification which is not intended to be limited to the embodiments disclosed here. This invention successfully discloses both the design and the construction of a two wheel drive all terrain bicycle. The two wheel drive system dramatically increases traction and mobility, especially during uphill climbs on loose or slippery material. In order to further reduce the weight of the bicycle, a weight reduction could be sought for the drive train components. A hollow rigid main drive shaft capable of transmitting the necessary amount of torque, possibly made out of composites, will significantly reduce the weight. Also, larger but lighter aluminum or composite gears could be used for the front and rear bevel systems. This could mean an overall weight reduction of 3–4 pounds which would make the bicycle's weight extremely competitive. The invention discloses an excellent method of manufacturing a functional two wheel drive bicycle with an attractive design. As envisioned, this fully integrated two wheel drive bicycle would not only compete with the most advanced bicycles on the market but would also create an entirely new category in the industry.

THIRD EMBODIMENT OF THE TWO WHEEL DRIVE BICYCLE WITH A SHOCK-ABSORBING FRONT FORK

Figure 14:
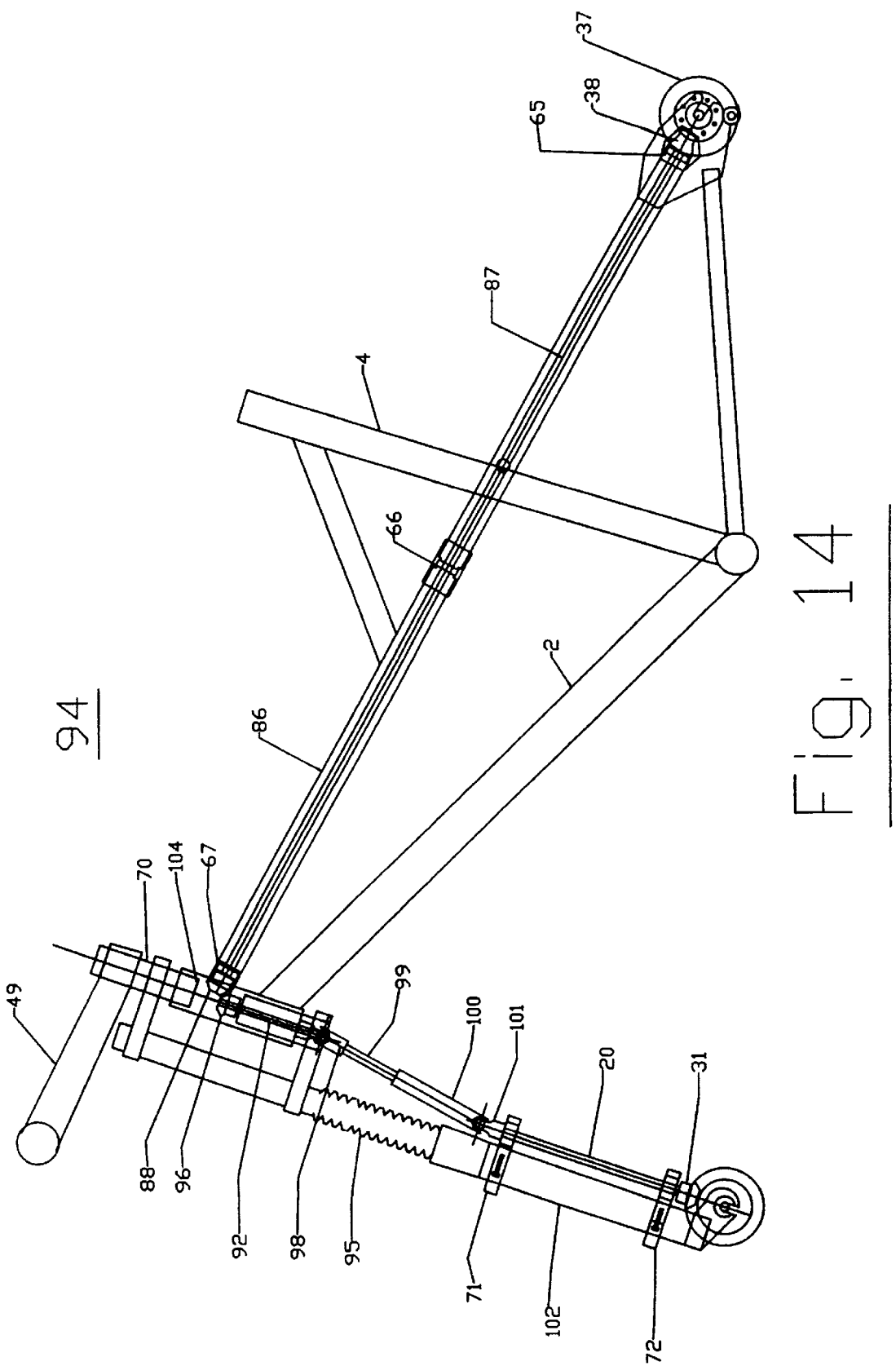
FIG. 14 is a view of the two wheel drive bicycle with a shock-absorbing front fork as described in the third embodiment
Figures 15, 16:
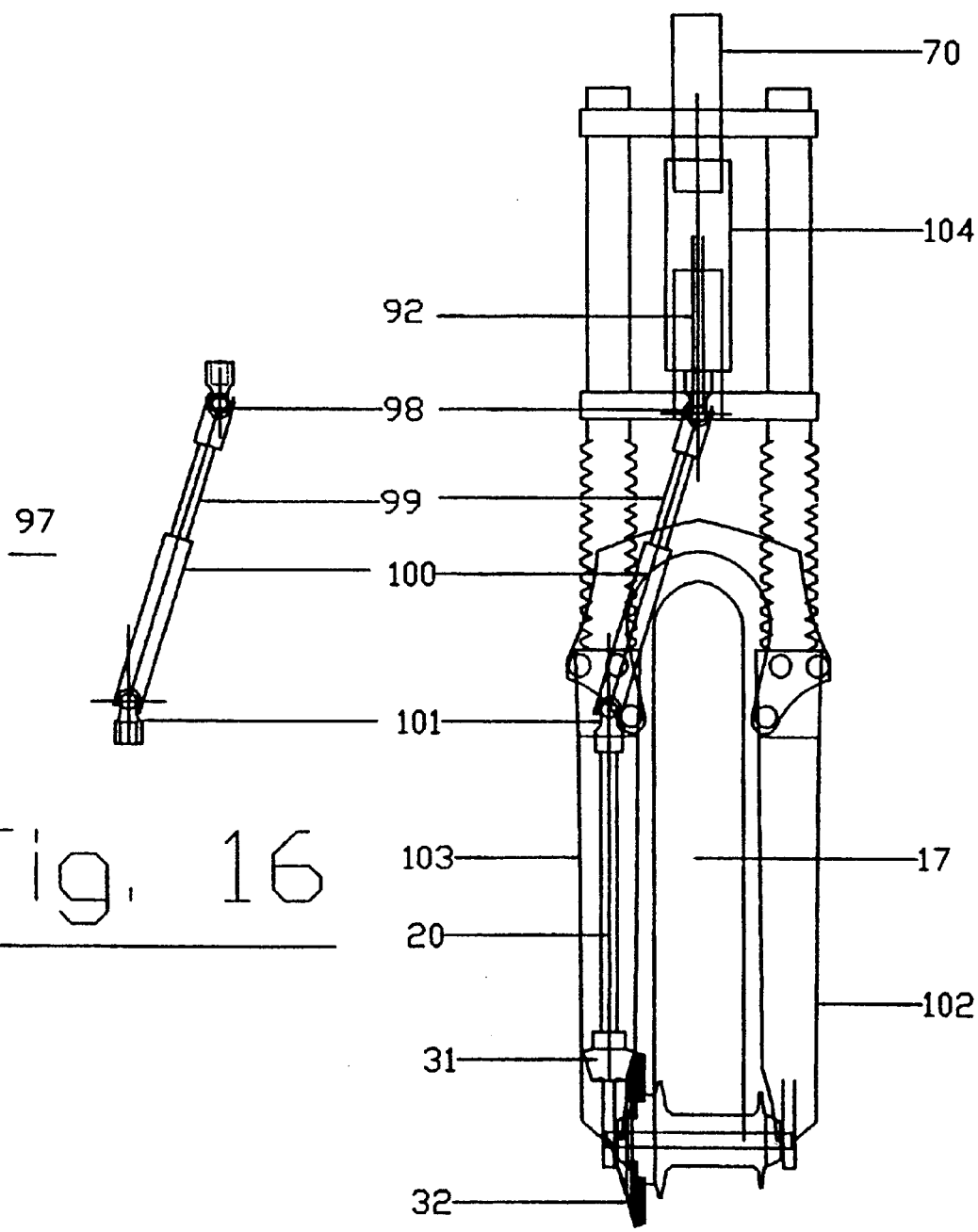
FIG. 15 is a front view of the shock-absorbing front fork with the expandable universal joint system.
FIG. 16 is a view of the expandable universal joint system.

FIGS. 14, 15, and 16 illustrate aspects of a two wheel drive bicycle 94 that incorporates a suspension system, in particular a shock-absorbing front fork 95. In the third embodiment of the two wheel drive bicycle 94, power is transferred from the pedals (not shown) to the rear wheel bevel gear 37 mounted circumferentially on the outer region of the rear drive sprockets (not shown) to result in simultaneous turning of the rear drive sprockets (not shown) and the rear wheel bevel gear 37. The rear wheel bevel gear 37 meshes with a drive shaft pinion gear 38 to transfer power to the straight main drive shaft 87. The use and positioning of rear drive shaft roller bearing 65, the center drive shaft roller bearing 66, and the front drive shaft roller bearing 67 to support the straight main drive shaft 87 are as previously described for the second embodiment.

In the third embodiment of the two wheel drive bicycle 94 as shown in FIG. 14, the straight main drive shaft 87 transmits power to the front drive system via a shaft miter gear 88 which interfaces with a second miter gear 96. The second miter gear 96 in turn delivers power to the front wheel 17 through the short connecting shaft 92, an expandable universal joint system 97, the front drive shaft 20, the front pinion gear 31, and the front bevel gear 32 in order to drive the front wheel 17. The expandable universal joint system 97, is featured in a broken-out view in FIG. 16 and includes a first universal joint 98, a sliding inner shaft 99, a sliding outer shaft 100, and a second universal joint 101.

In the third embodiment of the two wheel drive bicycle 94, the second miter gear 96 replaces the upper miter gear 40 of the second embodiment of the two wheel drive bicycle 79. However, the relative positioning of the shaft miter gear 88 and the second miter gear 96 in the third embodiment of the two wheel drive bicycle should not be considered as limiting in any manner for the present invention.

FIGS. 14 and 15 illustrate aspects of the two wheel drive bicycle 94 design which encompass a front fork assembly with a shock-absorbing front fork 95 and includes a neck tube 70 that is connected at both ends to the shock-absorbing front fork 95. The shock-absorbing front fork 95 has a left fork member 102 and a right fork member 103 (as viewed from the rider's perspective) that pass along the sides of the front tire 17. The right fork member 103 holds the front drive shaft 20 in the present embodiment 94. The left fork member 102 and the right fork member 103 each includes a shock-absorbing section that allows the left fork member 102 and the right fork member 103 to expand and to shorten in length.

The neck tube 70 has a cutout section as previously described to enable pivoting around the shaft miter gear 88 and the second miter gear 96 during steering of the bicycle 94. The head tube 104 of the third embodiment of the two wheel drive bicycle 94 is of sufficient diameter to enclose the meshing shaft miter gear 88 and second miter gear 96. Alternative embodiments (not shown) would eliminate the need for a head tube 104 thereby exposing the shaft miter gear 88, the second miter gear 96, and the short connecting shaft 92.

As shown in FIGS. 14 and 15, the expandable universal joint system 97 has a first universal joint 98, a sliding inner shaft 99, a sliding outer shaft 100, and a second universal joint 101. The expandable universal joint system 97 is mounted upon the shock-absorbing front fork 95 so that, upon expansion or contraction of the left fork member 102 and right fork member 103, the sliding outer shaft 100 will slide over the sliding inner shaft 99 to adjust with the differing overall length of the shock-absorbing front fork 95. While the sliding outer shaft 100 slides over the sliding inner shaft 99, the sliding outer shaft 100 and the sliding inner shaft 99 remain in contact so that they can continue to rotate in unison for maintaining power transmission to the front wheel.

The disclosed front fork assembly with the shock-absorbing front fork 95 is not to be construed as limiting the present invention. Those skilled in the art will recognize alternative designs for a front fork assembly that incorporates a suspension system and that can be attached to the frame without interfering with steering or rotation of the front wheel. Additionally, the disclosed front drive shaft system with the expandable universal joint system 97 is not to be construed as limiting. Those skilled in the art will understand alternative designs for an adjustable drive component that adjusts with the movement of front wheel relative to the frame as shock is applied while maintaining power transfer to the front wheel. Finally, the drive system disclosed in the third embodiment can alternatively include the modified drive sprocket 34, the second drive chain 24, and the second drive sprocket 25 as described in the first embodiment of the two wheel drive bicycle 78 to transmit power to the front wheel.

FOURTH EMBODIMENT OF THE TWO WHEEL DRIVE BICYCLE WITH A SHOCK-ABSORBING FRONT FORK

FIGS. 17 and 18 illustrate an aspect of a two wheel drive bicycle that incorporates a shock-absorbing fork 110. In the fourth embodiment of the two wheel drive bicycle, power is transferred from the rear wheel to the short connecting shaft 92 through the same drive components (not shown) as described in the third embodiment. In the fourth embodiment, power is transferred through the short connecting shaft 92, the first universal joint 98, the second short shaft 36, the second universal joint 101, an expanding straight drive shaft system 109, and the front pinion gear 31 to the front bevel gear 32 in order to drive the front wheel 17. The expanding straight drive shaft system 109 features a first sliding shaft 105 and a second sliding shaft 106 and is shown in a broken-out view in FIG. 18.

The fourth embodiment of the front fork assembly features a shock-absorbing fork 110 that includes a neck tube 70 that is connected at both ends to the shock-absorbing fork 110. The shock-absorbing fork 110 has an expandable left fork member 107 and an expandable right fork member 108 (as viewed from the rider's perspective) that pass along the sides of the front tire 17. In the fourth embodiment, the expandable right fork member 108 holds the expanding straight drive shaft system 109. The expanding left fork member 107 and the expanding right fork member 108 each include a shock-absorbing section that allows the expanding left fork member 107 and the expanding right fork member 108 to expand and to shorten in length.

As shown in FIG. 17 the expanding straight drive shaft system 109 is mounted on the expanding right fork member 108 so that upon expansion or contraction of the expanding right fork member 108, the first sliding shaft 105 will slide within the second sliding shaft 106 to adjust with the differing overall length of the shock-absorbing fork 110. While the first sliding shaft 105 slides over the second sliding shaft 106, the first sliding shaft 105 and the second sliding shaft 106 remain in contact so that they can continue to rotate in unison for maintaining power transmission to the front wheel 17.

The disclosed front fork assembly with the shock-absorbing fork 110 is not to be construed as limiting the present invention. Those skilled in the art will recognize alternative designs for a front fork assembly that incorporates a suspension system and that can be attached to the frame without interfering with steering or rotation of the front wheel. Additionally, the disclosed expanding straight drive shaft system 109 is not to be construed as limiting. Those skilled in the art will understand alternative designs for an adjustable drive component that adjusts with the movement of front wheel relative to the frame as shock is applied while maintaining power transfer to the front wheel.

FIFTH EMBODIMENT OF THE TWO WHEEL DRIVE BICYCLE WITH A SHOCK-ABSORBING FRONT FORK

In the fifth embodiment of the two wheel drive bicycle (not shown), alternate drive components are disclosed to transmit the power from the main drive shaft 87 to the short connecting shaft 92. In the fifth embodiment of the two wheel drive bicycle (not shown) alternate drive components are disclosed which replace the shaft miter gear 88 and the second miter gear 96 as disclosed in the third embodiment of the two wheel drive bicycle 94. These alternate drive components include but are not limited to alternate gearing combinations and alternate universal joint combinations. One alternate drive component would have a screw-type gear (not shown) on the forward end of the main drive shaft 87 and a meshing second gear (not shown) on the upper end of short connecting shaft 92, wherein the screw-type gear (not shown) is in continual contact with and powers the meshing gear (not shown) for rotating the short connecting shaft 92. Additionally, pinion and bevel gear combinations may be utilized. Another alternate drive component would have a universal joint combination to transfer power from the main drive shaft 87 to the short connecting shaft 92.

In the fifth embodiment of the two wheel drive bicycle (not shown), the shock-absorbing front fork 95 is connected to the neck tube 70, which includes a cutout section as previously described, to enable the neck tube to pivot around the alternate drive components disclosed herein.

The alternate drive components disclosed herein are not to be construed as limiting and more generally include any gearing or joint combination which successfully passes through the approximate 90 degree angle from the main drive shaft 87 down to the short connecting shaft 92. Those skilled in the art will recognize other methods and gearing or joint combinations, including any drive component which does not interfere with the turning radius of the front wheel while enabling power to be transmitted from the main shaft down to the front wheel. While the above is directed to the third embodiment of the present invention, those skilled in the art will recognize that alternate drive components can replace the miter gears of the first, second, and further embodiments of the invention without departing from the basic scope of the invention, which scope is determined by the claims which follow.

In considering this invention, it should be remembered that the present disclosure is only illustrative, and the scope of the invention is not intended to be limited to the embodiments disclosed herein. This invention discloses both the design and the construction of a two wheel drive all terrain bicycle with a shock-absorbing front fork. The two wheel drive system increases traction and mobility, especially during uphill climbs on loose or slippery material. The shock-absorbing front fork ensures a smoother ride and greater contact of the front wheel with the terrain for all-around improved rider experience. The invention discloses an excellent method of manufacturing a functional two wheel drive bicycle with a shock-absorbing front fork. As envisioned, this fully integrated two wheel drive bicycle would not only compete with the most advanced bicycles on the market but would also create an entirely new category in the industry.

While the foregoing is directed to the first, second, third, fourth and fifth embodiments of the present invention, other and further embodiments of the invention may be devised without departing from the basic scope thereof, which scope is determined by the claims which follow.

We claim:

1. A two wheel drive bicycle comprising:
   a power transferring mechanism;
   a frame, the frame including a head tube;
   a steering mechanism pivotably attached to the head tube;
   a rear wheel rotatably mounted on the frame;
   a front wheel rotatably mounted on the steering mechanism;
   a rear wheel drive for transmitting power from the power transferring mechanism to the rear wheel;
   a front wheel drive for transmitting power to the front wheel, wherein the front wheel drive includes at least one drive component passing at least partially through the head tube; and
   wherein the steering mechanism includes a suspension system for absorbing shock applied to the front wheel.

2. The two wheel drive bicycle according to claim 1 wherein the front wheel drive further includes at least one adjustable drive component for transmitting power to the front wheel while shock is applied to the front wheel.

3. The two wheel drive bicycle according to claim 1, wherein the suspension system has a shock-absorbing front fork.

4. The two wheel drive bicycle according to claim 2, wherein the adjustable drive component has at least one expandable universal joint system.

5. The two wheel drive bicycle according to claim 2, wherein the adjustable drive component has at least one expandable straight shaft system.

6. A two wheel drive bicycle comprising:
   a power transferring mechanism;
   a frame;
   a steering mechanism pivotably attached to the frame;
   a rear wheel rotatably mounted on the frame;
   a front wheel rotatably mounted on the steering mechanism;
   a rear wheel drive for transmitting power from the power transferring mechanism to the rear wheel;
   a front wheel drive for transmitting power to the front wheel, wherein the front wheel drive includes at least one drive component that rotates substantially coaxially with the steering mechanism; and
   wherein the steering mechanism includes a suspension system for absorbing shock applied to the front wheel.

7. The two wheel drive bicycle according to claim 6 wherein the front wheel drive further includes at least one adjustable drive component for transmitting power to the front wheel while shock is applied to the front wheel.

8. The two wheel drive bicycle according to claim 6, wherein the suspension system has a shock-absorbing front fork.

9. The two wheel drive bicycle according to claim 7, wherein the adjustable drive component has at least one expandable universal joint system.

10. The two wheel drive bicycle according to claim 7, wherein the adjustable drive component has at least one expandable straight shaft system.

11. A two wheel drive bicycle comprising:
    a power transferring mechanism;
    a frame;
    a front wheel;
    a steering mechanism;
    the front wheel rotatably mounted on the steering mechanism;
    the steering mechanism pivotably attached to the frame and including a suspension system for absorbing shock applied to the front wheel;
    a rear wheel rotatably mounted on the frame;
    a rear wheel drive for transmitting power from the power transferring mechanism to the rear wheel; and
    a front wheel drive operating to transmit power from the rear wheel to the front wheel, wherein the front wheel drive includes at least one adjustable drive component accommodating movement of the suspension system when shock is applied to the front wheel.

12. The two wheel drive bicycle according to claim 11, wherein the suspension system has a shock-absorbing front fork.

13. The two wheel drive bicycle according to claim 11, wherein the adjustable drive component has at least one expandable universal joint system.

14. The two wheel drive bicycle according to claim 11, wherein the adjustable drive component has at least one expandable straight shaft system.

* * * * *